US006283406B1

(12) United States Patent
Remington et al.

(10) Patent No.: US 6,283,406 B1
(45) Date of Patent: Sep. 4, 2001

(54) USE OF FLOW INJECTION AND EXTRACTION TO CONTROL BLADE VORTEX INTERACTION AND HIGH SPEED IMPULSIVE NOISE IN HELICOPTERS

(75) Inventors: Paul J. Remington, Sudbury; William B. Coney, Littleton; Alan Robert Douglas Curtis, Acton, all of MA (US)

(73) Assignee: GTE Service Corporation, Irving, TX (US)

(*) Notice: Subject to any disclaimer, the term of this patent is extended or adjusted under 35 U.S.C. 154(b) by 0 days.

(21) Appl. No.: 09/393,506

(22) Filed: Sep. 10, 1999

(51) Int. Cl.⁷ ................................................. B64C 27/72

(52) U.S. Cl. .................. 244/1 N; 244/17.11; 244/17.13; 244/199; 244/207

(58) Field of Search ............................... 244/17.11, 1 N, 244/17.13, 199, 207–209; 416/500, 91, 20–22

(56) References Cited

U.S. PATENT DOCUMENTS

| 3,090,584 | * | 5/1963 | Kuchemann et al. | 244/199 |
|---|---|---|---|---|
| 3,936,013 | * | 2/1976 | Yuan | 244/199 |
| 3,974,986 | * | 8/1976 | Johnstone | 244/199 |
| 4,045,146 | * | 8/1977 | Crimi | 416/91 |
| 4,477,042 | * | 10/1984 | Griswold, II | 244/199 |
| 5,551,649 | * | 9/1996 | Kaptein | 244/1 N |
| 5,562,414 | * | 10/1996 | Azuma | 244/199 |
| 5,791,875 | | 8/1998 | Ngo . | |
| 5,813,625 | * | 9/1998 | Hassan et al. | 244/207 |
| 6,092,990 | * | 7/2000 | Hassan et al. | 244/199 |

FOREIGN PATENT DOCUMENTS

2132053 * 6/1984 (GB) ........................... 244/1 N

OTHER PUBLICATIONS

Z. El–Ramly and W. J.Rainbird, "Effect of wing–mounted devices on the trailing vortex systems in the near field", Proceedings of the Aircraft Wake Vortices Conference, Mar. 15–17, 1977, FAA–RD–77–68.

H. F. Faery, Jr. J. F. Marchman, III, "Effect of Whitcomb winglets and other wingtip modifications on wake vortices", Proceedings of the Aircraft Wake Vortices Conferences, Mar. 15–17, 1977, FAA–RD–77–68.

R. S. Snedeker, "Effect of air injection on the torque produced by a trailing vortex", J. of Aircraft, 9(9), 682–684, 1972.

J. F. Marchman, III and J. N. Uzel. "Effect of sereral wing tip modifications on trailing vortex", J. of Aircraft, 9(9), 684–686, 1972.

(List continued on next page.)

Primary Examiner—Galen L. Barefoot
(74) Attorney, Agent, or Firm—Leonard Charles Suchyta; James K. Weixel

(57) ABSTRACT

An active control device for reducing high-speed impulsive ("HSI") and blade vortex interaction ("BVI") noise in a rotor aircraft, such as a helicopter, is disclosed. The system comprises a plurality of rotor blades extending radially in spaced relationship from a central hub, each of the blades having spaced apart upper and lower surfaces, an interior volume between the surfaces, and leading and trailing edges at the respective joined edges of the upper and lower surfaces. Air intake passages are disposed on the surfaces of each blade proximate the leading edge to controllably admit air into the interior volume; and air output passages are disposed on the surfaces of each blade proximate the trailing edge and the outer edge tip to controllably expel air from the interior volume of the blade. Admitting and expelling of air into and out of the interior volume of each blade is controlled in accordance with a determined condition of that blade. When the presence of BVI or HSI noise, or any condition giving rise to such noise, is sensed, the admittance and expulsion of air is activated to minimize the noise.

32 Claims, 7 Drawing Sheets

OTHER PUBLICATIONS

P. O. Jarvinen. "Aircraft wingtip vortex modification", J. of Aircraft, 10(1) 63–64, 1973.

J. M. Wu, A. D. Vakili, F. T. Gilliam. "Aerodynamic interactions of wingtip flow with discrete wingtip jets", American Institute of Aeronautics and Astronautics Paper No. AIAA–84–2206, 1984.

A. H. Logan. "Vortex velocity distributions at large downstream distances", J. of Aircraft, 8(11) 930–931, 1971.

H. L. Kantha, W. S. Lewellen and F. H. Durgin. "Response of a trailing vortex to air injection into the core", J. of Aircraft, 9(3), 254–256, 1972.

S. Y. Lin and Y. S. Chin. "Numerical study on transonic blade–vortex interaction noise control", Proceedings of the First Joint CEAS/AIAA Aeroacoustics Conference, Munich, Jun. 12–15, 1995, Paper CEAS/AIAA–95–049, pp. 347–356, 1995.

* cited by examiner

USE OF FLOW INJECTION AND EXTRACTION TO CONTROL BLADE VORTEX INTERACTION AND HIGH SPEED IMPULSIVE NOISE IN HELICOPTERS

BACKGROUND OF THE INVENTION

The present invention relates to the reduction of noise caused by the movement of aircraft rotor blades such as those found in helicopters. More particularly, the present invention is concerned with reducing high speed impulsive noise in aircraft rotor blades as well as the additional problem of noise caused by blade vortex interaction. It is desirable to reduce noise of these types from the human factors standpoint of reducing environmental noise pollution and possible damage to hearing. In addition, in surveillance operations or military combat situations, such noise impairs the ability to avoid detection by criminal suspects or hostile forces.

The primary sources of helicopter blade tonal noise are thickness noise, loading noise, blade vortex interaction noise (BVI) and high-speed impulsive noise (HSI). In addition to these tonal sources there are a wide variety of broad band noise sources, all of which are produced by random pressure fluctuations on the rotor blade surfaces. In hover, thickness noise and loading noise are the predominant sources. Thickness noise comes about because the blade displaces air as it rotates. The steady lift and drag forces on the blade generate loading noise. Broad band noise is generally less intense than tonal noise, and, of the tonal noise sources, BVI and HSI noise are the most intense and annoying when they occur.

HSI noise is related to thickness noise. HSI noise occurs when the forward speed of the blade tip relative to the air approaches sonic velocity. This typically only occurs on the side of the helicopter where the blade is moving in the same direction as the helicopter. As the air accelerates to move around the finite thickness of the blade shocks form that lead to a dramatic increase in impulsive noise. The result can be considered as two steady volume sources on the blade, an outward flowing source on the front half and an inward flowing source on the rear half of the blade. The fact that the steady sources are in motion produces sound. In forward flight the advancing blade may have regions where the flow is locally supersonic because of the finite thickness of the blade, even though the sum of the blade's forward velocity and the helicopter flight speed may be subsonic. These local regions of supersonic flow can lead to significant intensification of the sound that is typically referred to as HSI noise which occurs at high forward speed when the blade tip mach number on the advancing side approaches 0.85. The intensification of the noise appears to be associated with the appearance of shock near the blade tip where the flow becomes locally sonic. As already noted, HSI noise has many of the characteristics of thickness noise in that it radiates strongly in the plane of the rotor. However, HSI noise is considerably more intense than thickness noise and the resulting pressure pulses are more asymmetric in nature due to nonlinear effects.

The approach to reducing high speed impulsive noise in rotor blades has been to employ thin, tapered, or swept end blades. While these modifications can reduce HSI noise, they can have deleterious effects such as stall at lower angles of attack and unfavorable pitching—moment characteristics.

BVI noise occurs when a blade encounters the trailing edge vortex of a preceding blade, typically during low speed forward descending flight. The variations in the flow velocity in the vortex on interacting with the blade cause pressure fluctuations that radiate and create intense impulsive noise. The intensity of the noise depends on the strength of the vortex and the closeness of its approach to the helicopter blade. Consequently, modifying the velocity distribution in the vortex is a method by which BVI noise can be controlled. One approach for affecting the velocity distribution in the vortex is described in U.S. Pat. No. 5,791,875 to Ngo which describes a system for directing pressurized air out of the rotor blade tip to reduce blade vortex interaction. The Ngo approach, however, does not take into account all of the factors that contribute to the production of BVI noise, nor does it provide for the reduction of HSI noise. Furthermore, the Ngo approach of cancelling the blade tip vortices by injecting air at the tip can be counterproductive in that it can kill the lift of the blade, thus reducing helicopter performance.

Accordingly, there is a need for a system for reducing aircraft rotor noise, and, in particular, for reducing high speed impulsive noise, especially in combination with a system for also reducing blade vortex interaction noise.

SUMMARY OF THE INVENTION

The present invention is directed to a system and method for reducing aircraft rotor noise and especially high speed impulsive blade noise and noise caused by blade vortex interaction that substantially avoids one or more of the problems associated with the prior art.

To achieve the objects and advantages, and in accordance with the purpose of the invention, as embodied and broadly described herein, the present invention, in one of its embodiments, provides a system for reducing high speed impulsive blade noise in aircraft rotors comprising: a plurality of rotor blades extending radially in spaced relationship from a central hub, each of the blades having spaced apart upper and lower surfaces, an interior volume between the surfaces, and leading and trailing edges at the respective joined edges of the upper and lower surfaces. Air intake passages are disposed on the surfaces of each blade proximate the leading edge and the outer edge tip to controllably admit air into the interior volume; and air output passages are disposed on the surfaces of each blade proximate the trailing edge and the outer edge tip to controllably expel air from the interior volume of the blade. Admitting and expelling of air into and out of the interior volume of each blade is controlled in accordance with a determined condition of that blade or the environment associated with the blade.

The two distinct approaches have four distinct components: a flow device at the helicopter blade tip; a helicopter condition-monitoring system for determining when to turn on the flow device; a set of sensors for monitoring the noise reduction performance of the flow device; and a control system for adjusting the operating parameters of the flow device based on the noise reduction performance monitoring sensors.

In one aspect of the invention a condition that controls admitting or expelling of air is the position of the rotating blade, air being admitted and expelled only during essentially forward-rotary movement of the blade relative to the direction of flight of the aircraft.

In another aspect of the invention, admitting or expelling air is controlled in accordance with pressure fluctuations on the rotor blade, rotational speed of the blade, aircraft forward speed relative to the ground, or detected blade noise, as registered by sensors placed primarily on the rotor blades.

In an additional embodiment of the invention, the above-described system for reducing high speed impulsive blade noise is combined with a system for alleviating rotor blade vortex interaction which comprises providing pressurized air output passages at an outboard tip edge of each rotor blade to controllably expel pressurized air from the interior volume. The air output passage utilized and flow rate at which the air is expelled being dictated by the sensed pressure state of the blade.

For each noise mechanism here are two candidates for the noise reduction monitoring sensors: a blade mounted set of pressure sensors, and a fuselage-mounted set of microphones.

It is to be understood that both the foregoing general description and the following detailed description are exemplary and explanatory only and are not restrictive of the invention, as claimed.

The accompanying drawings, which are incorporated in and constitute a part of this specification, illustrate one several embodiments of the invention and together with the description, serve to explain the principles of the invention.

DESCRIPTION OF THE PREFERRED EMBODIMENTS

Figure 1:
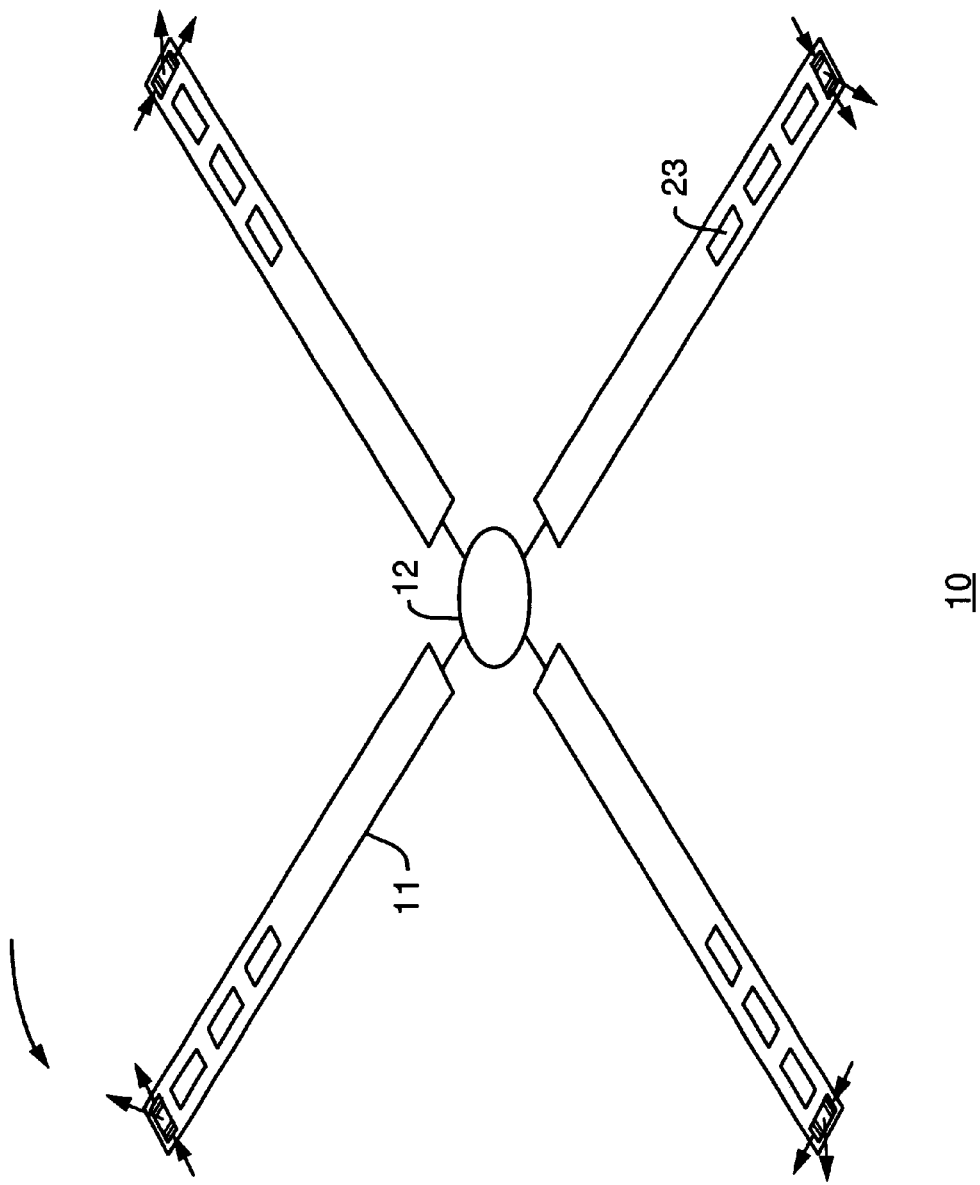
FIG. 1 is a perspective view illustrating the system for reducing rotor noise in accordance with the invention.

Reference will now be made in detail to the present exemplary embodiments of the invention, examples of which are illustrated in the accompanying drawings. Wherever possible, the same reference numbers will be used throughout the drawings to refer to the same or like parts.

In accordance with the present invention, a system and method are provided for reducing rotor blade noise in aircraft such as helicopters, and, in particular, tonal noise such as high speed impulsive noise (HSI) and blade vortex interaction noise (BVI).

The system and method of the invention, in their various embodiments will, however, be more fully appreciated and comprehended by making reference to the drawing, which are illustrative thereof.

The HSI flow device includes a region near the tip of the forward half of the blade, top and bottom, through which flow is sucked in and a region near the tip of the back half of the blade, top and bottom, through which flow is ejected. This approach will reduce the amount that the flow must accelerate to get around the blade and reduce or eliminate the formation of shocks, thereby reducing HIS noise.

Helicopter condition monitoring is achieved when the flow device is turned on when the sum of the forward speed of the helicopter and the blade rotational speed becomes near sonic. The exact velocity may be determined during flight tests and generally is specific to a particular helicopter and blade configuration.

Noise reduction performance monitoring is achieved as follows.

The performance of the flow device in reducing noise is monitored by one or both of two systems. A set of fuselage mounted microphones monitors the pressure signature and determines the reduction in the impulse amplitude. Alternatively a line array of pressure sensors on the blade near the tip aligned in the direction of rotation may be used to monitor abrupt changes in pressure that would indicate the presence of a shock.

The control system function is provided by a on-board the helicopter which monitors the change in HSI noise using one or both of the noise reduction performance monitoring sensor candidates mentioned above (microphones and/or pressure sensors) and adjust the flow in the injection and extraction ports so as to minimize the noise. Several blade rotations may be necessary before the system becomes fully effective.

Figure 2:
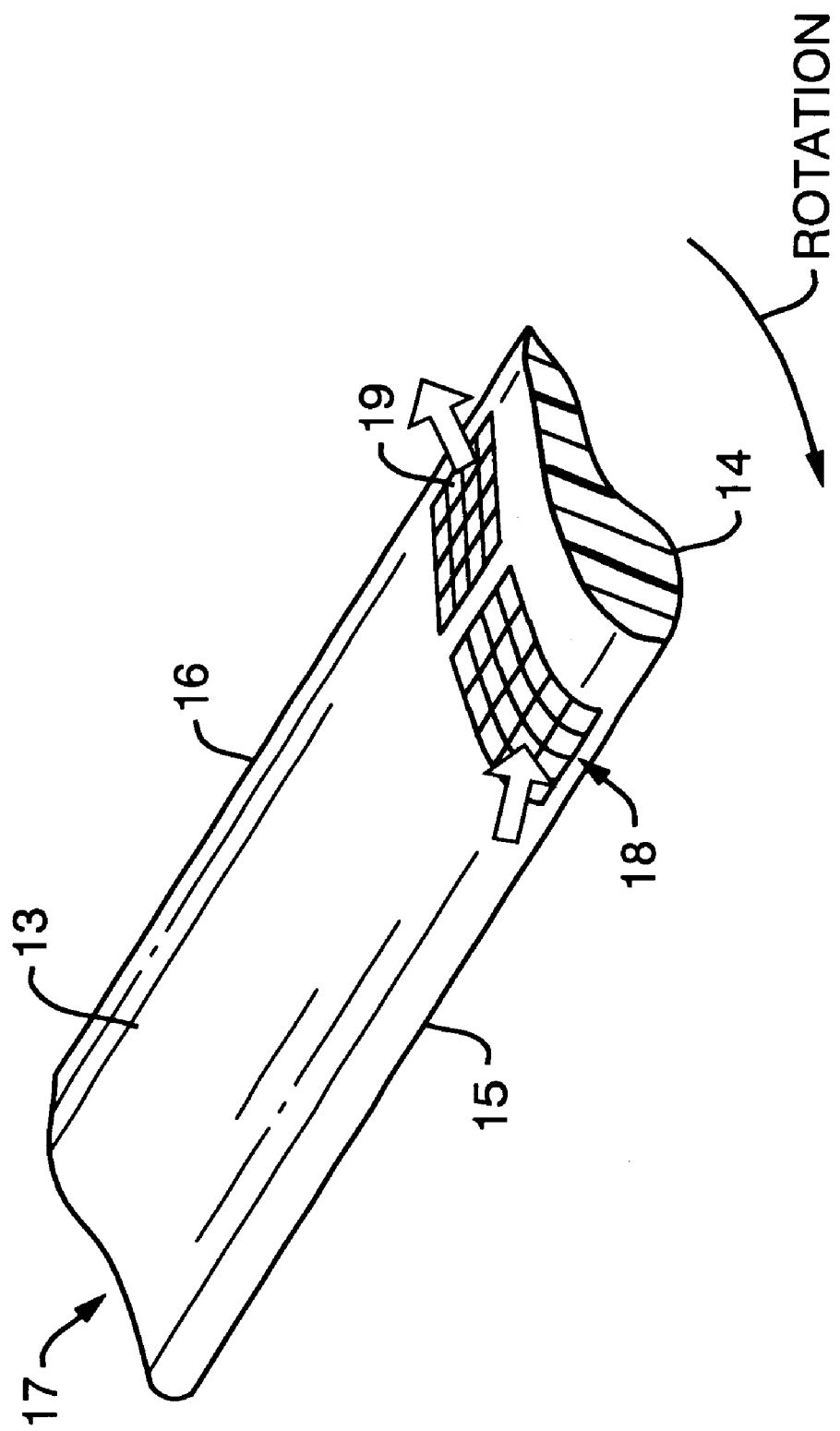
FIG. 2 is a perspective view illustrating a portion of a rotor blade in accordance with the invention for reducing HSI noise.

Directing attention to FIG. 1 of the drawings, the system in accordance with the present invention for reducing HSI blade noise as well as BVI noise is shown generally at 10 and comprises a plurality of rotor blades 11 extending radially in spaced relationship from central hub 12 which is rotatably mounted on an aircraft such as a helicopter (not shown). As further illustrated in FIG. 2 of the drawings, each of the rotor blades 11 has an upper surface 13 and a lower surface 14 which define an interior volume 17 between the two surfaces. A leading edge 15 and a trailing edge 16 are respectfully formed where the upper and lower surface edges are joined to one another. To reduce HSI blade noise in accordance with the present invention, air intake passages 18 are disposed on both the upper and lower surfaces 13, 14, respectively, of each rotor blade 11 proximate the leading edge 15 and the blade tip 28. These intake passages 18 controllably admit air into the interior volume 17 of the rotor blade. Air output passages 19 are also disposed on both the upper and lower surfaces of the rotor blade proximate the trailing edge 16 and the blade tip 28 to controllably expel air from the interior volume 17 of the rotor blade.

Control of the air intake and air output passages is conveniently accomplished, for example, by servo valves or other convenient techniques for closing and opening the passages in response to control signals received from sensors. Optionally, the flow rate of air can be adjusted manually by an aircraft crew member based on sensor or acoustic data received in the cabin. The means for controlling the admitting and expelling of air into and out of the interior volume of each blade through the air intake and output passages is accomplished in accordance with a predetermined condition of each blade during its rotation. The valves will set the flow rate to a prescribed value which will remain constant until the operating conditions around the blade change. One such condition for HSI noise control is the rotational position of each blade. The air passages are automatically open when the blade is in a substantially forward rotational position relative to the direction of flight of the aircraft or during a portion of that rotational position, as illustrated, for example, in FIG. 3 of the drawings.

Figure 3:
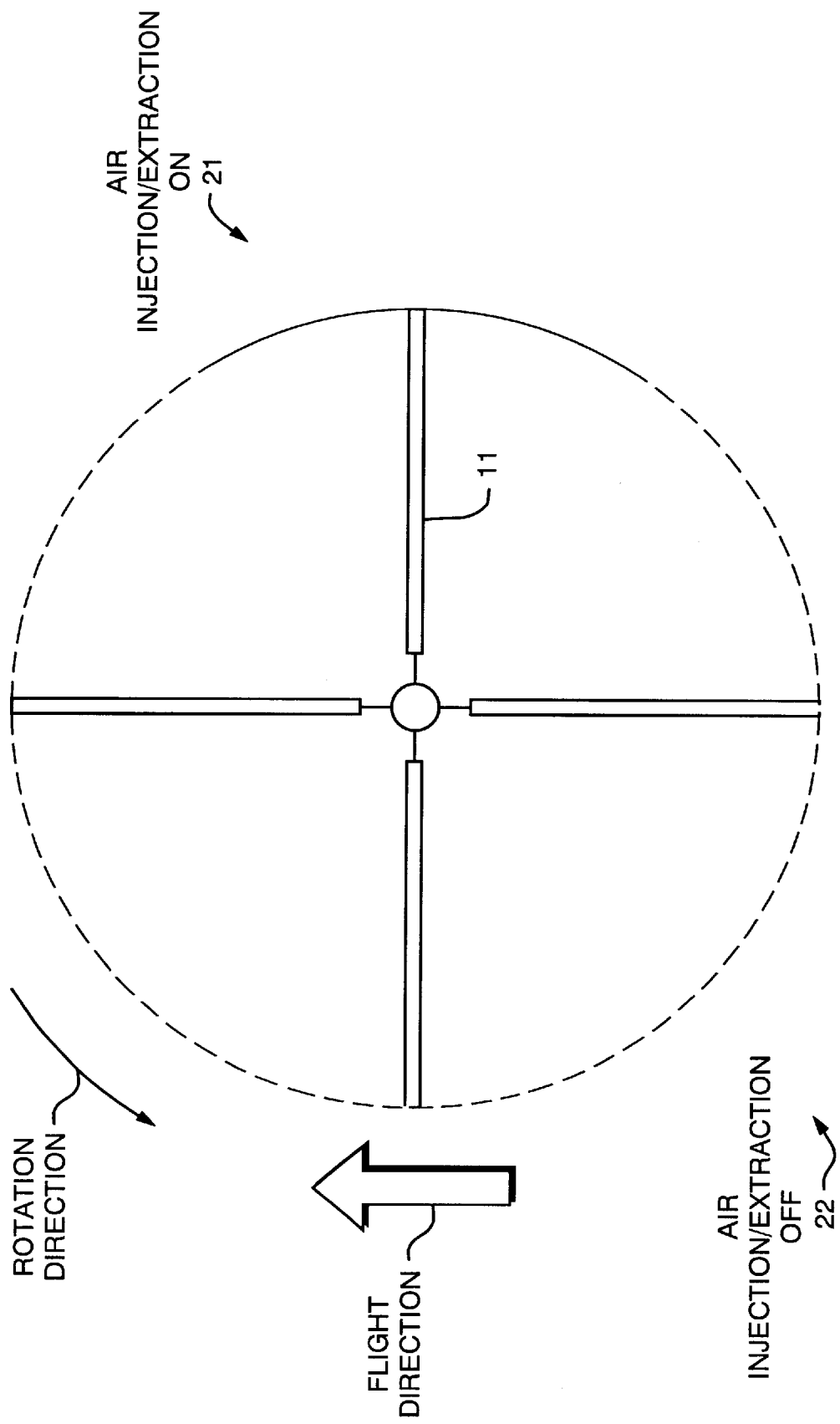
FIG. 3 is a top view illustrating air injection and extraction relative to blade position in accordance with the invention for reducing HSI noise.

In FIG. 3, it will be seen, schematically, that rotor blade 11 has its air intake passages in the open configuration to admit and expel air through the rotor blade only in the forward position 21 of the rotation. Otherwise, during the remainder of the circular rotation, shown at 22, the air injection/extraction control closes the air passages or otherwise prevents air from passing into and out of the interior of the blade. While this configuration would provide optimum reduction of HSI noise, it would require a control system capable of activating the servo valves in a matter of hundreds of microseconds, requiring the air passage servovalves to be located near the blade tips. In the alternative, the air passages could be maintained in an open position throughout the entire rotation. While this might increase drag on the blade, it would also reduce the complexity and expense of the control systems.

Figure 7:
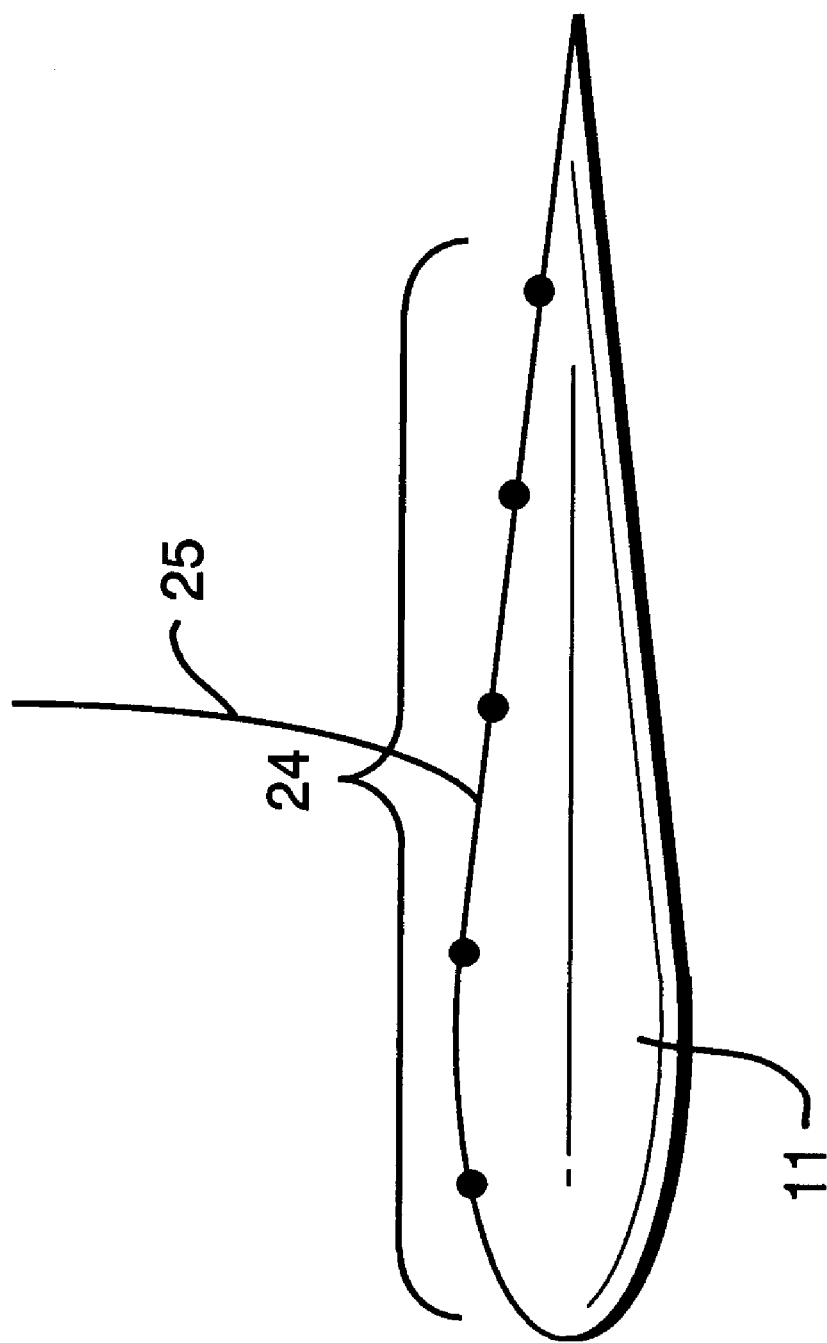
FIG. 7 is a side view of a helicopter rotor blade illustrating a line array of pressure sensors on the top surface of the blade for HSI noise reduction.

Additionally, other parameters can advantageously be used to activate or deactivate the system. In general, these parameters coincide with the conditions under which HSI blade noise is likely to occur. For example, in FIG. 7 of the drawings, a line array of pressure sensors 24 is shown placed on, or in proximity to, the upper surface of rotor blade 11. Sensors 24 are designed to measure pressure fluctuations signaling the development of a shockwave 25 which increases HSI noise.

Figure 6:
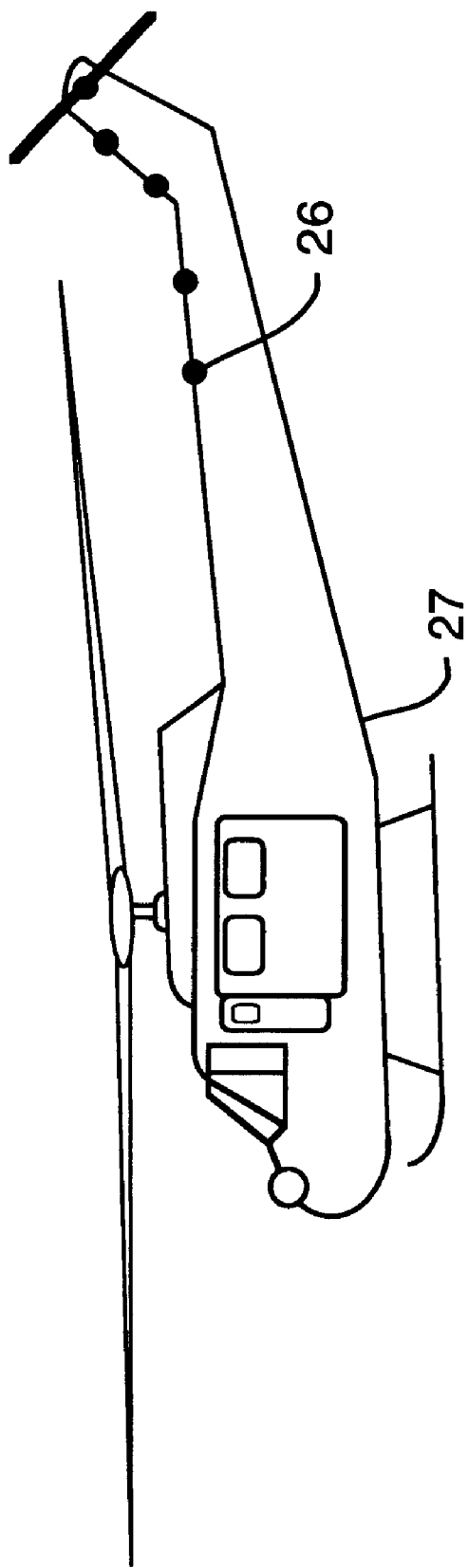
FIG. 6 is a side view of one embodiment of a rotary aircraft illustrating one configuration of sound sensors on the aircraft's fuselage for reducing both BVI and HSI noise.

Another example is shown in FIG. 6. FIG. 6 shows sound sensors 26 placed throughout the fuselage of helicopter 27. Sound sensors 26 measure any increase in tonal noise. In a preferred embodiment, the sound sensors are located both forward and aft of the rotor axis, for example, on the nose and rotor tail of the helicopter. Because HSI noise radiates primarily in the plane it originates in, sound sensors 26 are ideally placed high on the fuselage, as close as possible to the plane of the rotor. The output of the sensors is monitored and any reading falling within a predetermined value triggers the system for controlling HSI noise. For example, a pressure pulse of negative 300–400 Pascals would typically trigger the HSI noise reduction system.

Figure 4:
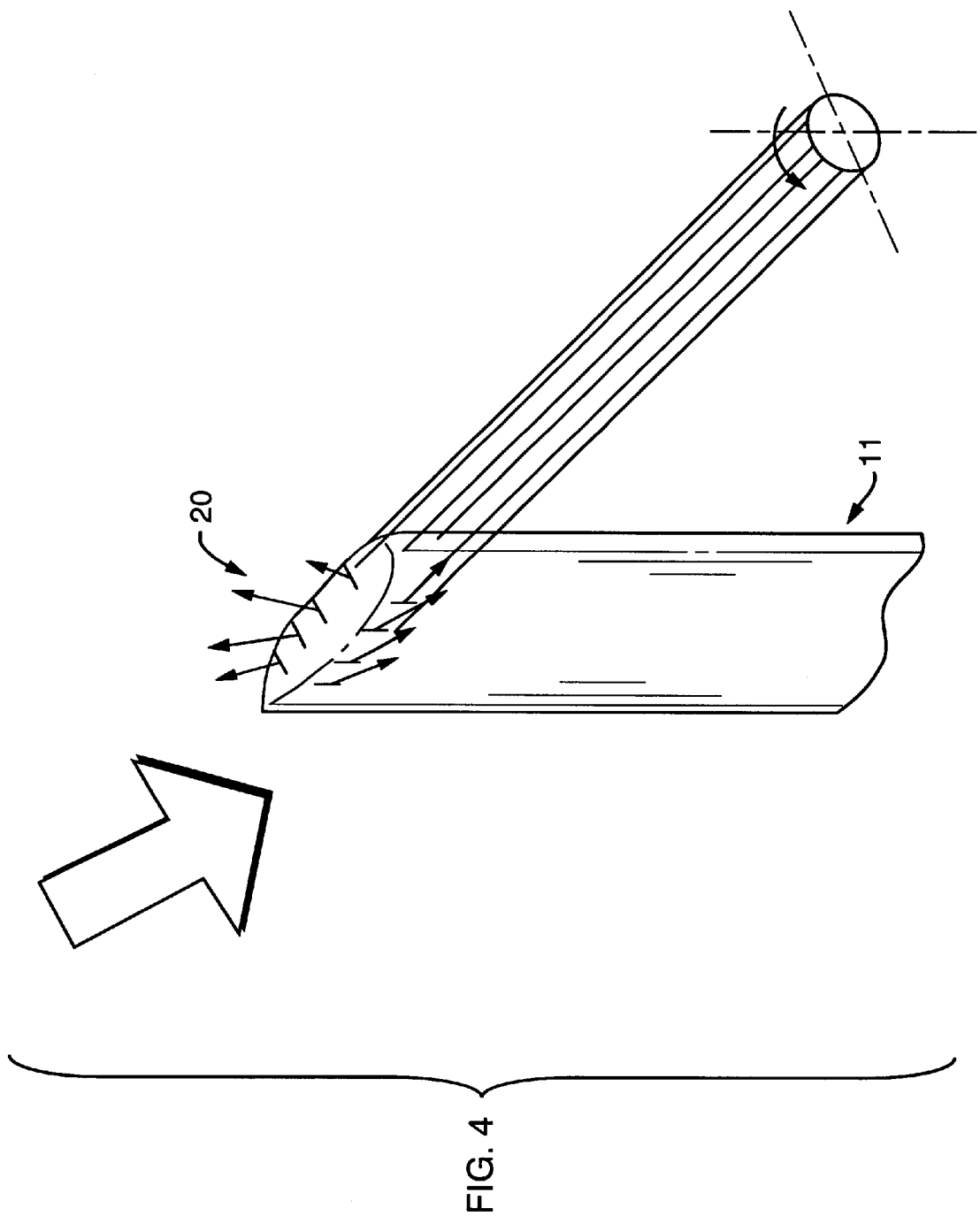
FIG. 4 is a perspective view illustrating blade tip output passages for reducing blade vortex interaction noise.

As further illustrated in FIG. 4 of the drawings, an additional embodiment of the present invention contemplates that the system for reducing HSI blade noise be used in conjunction with means for alleviating noise caused by rotor BVI. The flow device includes a number of jets at different locations and orientations at the tip of the blade, through which flow is ejected. This approach has been shown to cause the tip vortices to spread out and decay rapidly with distance from the blade tip. The decay and spreading out of the vortices reduce the generation of BVI noise when the vortices encounter a following blade. This approach does not attempt to introduce a counter rotating vortex that might reduce lift, as in the Ngo patent (U.S. Pat. No. 5,791,875), but rather uses an approach that accelerates the natural process of decay. Such approach also recognizes that the jet orientation and flow velocity needed to reduce BVI noise may depend on helicopter operating conditions. Consequently, this approach is unique in that it provides for adjustment of these parameters based on the observed BVI noise reduction.

The device is activated when the forward speed and rate of descent of the helicopter fall within a particular operating envelope likely to produce BVI noise. The exact operating profile may be determined through flight tests and may differ for different helicopter models and blade configurations.

The performance of the flow device in reducing BVI noise will be monitored by one or both of two systems mentioned above. A set of fuselage mounted microphones monitors the pressure signature and determines the reduction in the impulse amplitude. Alternatively, or in combination, a set of distributed pressure sensors on the blade surface determines if any sudden increase in blade pressure fluctuations arise which would indicate an encounter with a vortex.

A computer on-board the helicopter monitors the change in BVI noise using one or both of the noise reduction performance monitoring sensors (microphones and/or pressure sensors) and would select jet location and orientation (i.e., turn on a particular jet) and flow rate so as to reduce BVI noise. BVI noise is reduced by additionally providing blade tip air flow injection as illustrated, for example, in FIG. 4 of the drawings in which a plurality of air openings 20 are provided in the outboard tip of the rotor blade and in the surface of the rotor blade proximate the tip for expelling pressurized air. Pressurized air for jet flow injection is conveniently provided by an external source such as an air pump (not shown). Control of the air pressure provided to the air openings 20 is accomplished by means of BVI pressure sensors 23 on the surface of each blade, as illustrated in FIG. 1 of the drawing.

Figure 5:
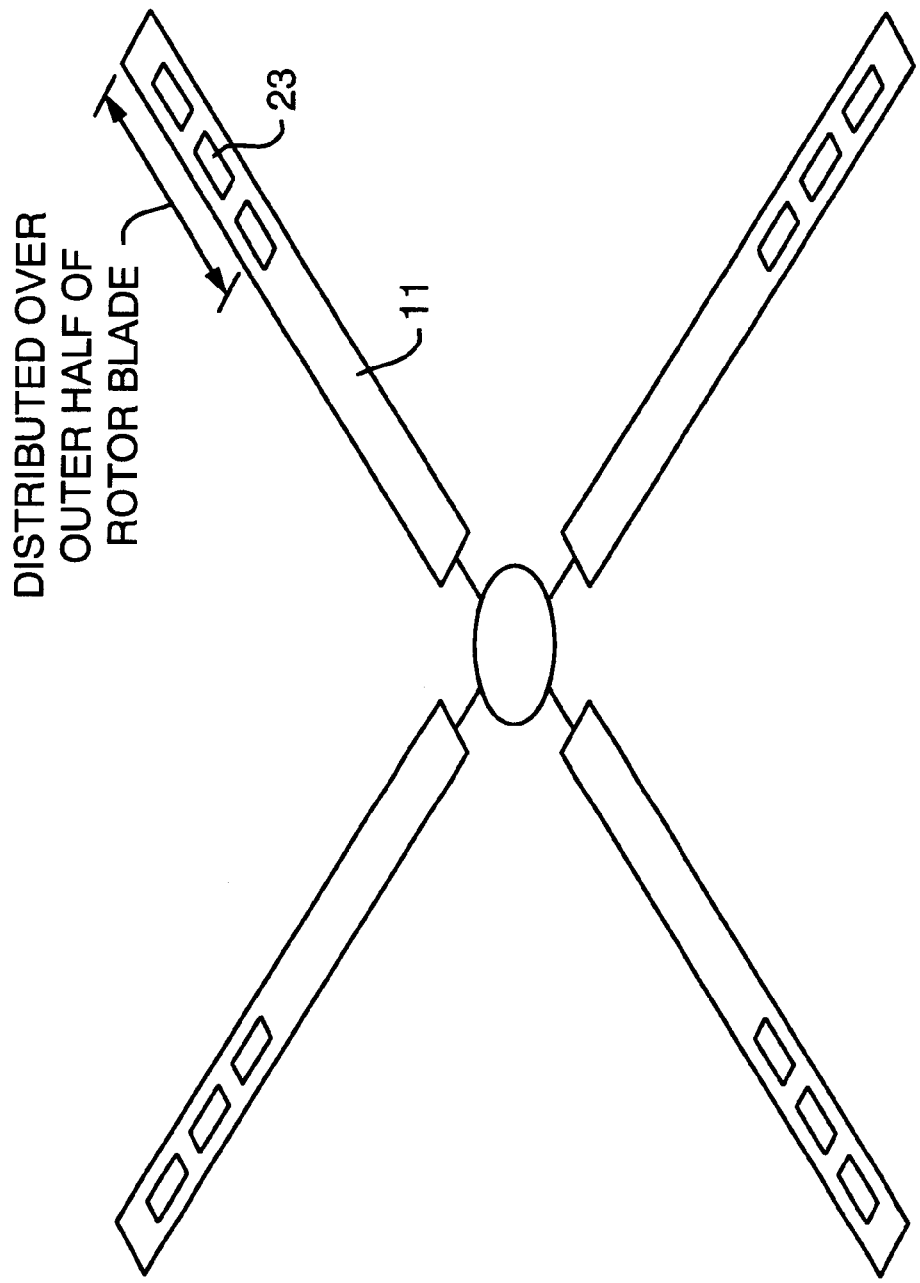
FIG. 5 is a perspective view illustrating the sensor placement on the rotor blades for reducing BVI noise.

A further configuration of sensor placement is shown in FIG. 5. FIG. 5 shows pressure sensors 23 placed along the outermost half of rotor 11 upper surface. The flow rate of the air pressure and the specific air opening that is activated is dictated by the pressure fluctuation sensed on the blade. As the conditions on the blade vary, the flow rate as well as the specific openings utilized are adjusted. This information is then stored in the controller's computer memory so that when the same condition is sensed on the blade at a later time, the air opening and flow rate previously utilized to minimize the noise will be activated.

As heretofore described, the conditions which produce HSI blade noise and BVI noise are significantly different and occur under different operating conditions. Accordingly, activation of the systems for reducing these two forms of tonal noise will be different and may or may not be located in the same portion of the rotor blade structure. Generally, HSI blade noise is encountered in high speed forward flight in which the forward advance of the blades approaches sonic velocity relative to the air. BVI is encountered typically in forward descending flight at 40–80 knots forward speed and 50 to 500 ft./min. descent rate.

It will be apparent to those skilled in the art that various modifications and variations can be made in the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A system for reducing high speed impulsive blade noise (HSI) in aircraft rotors, the system comprising:

a plurality of rotor blades extending radially in spaced relationship from a central hub, each of said blades having spaced apart upper and lower surfaces, an interior volume between said surfaces, and leading and trailing edge portions at respective opposing joined edges of said upper and lower surfaces of each blade;

air intake passages disposed on the upper and lower surfaces of each blade proximate the leading edge and tip edge to controllably admit air into said interior volume;

air output passages disposed on the upper and lower surfaces of each blade proximate the trailing edge and tip edge to controllably expel air from said interior volume; and means for controlling said admitting and expelling of air into and out of the interior volume of each blade in accordance with a determined condition of each blade during its rotation, wherein said controlling means includes sound sensors mounted off the blades for determining high speed impulse noise produced by said rotating blades and controlling admitting or expelling of air through said passages in accordance therewith.

2. The system of claim 1 wherein said controlling means admits and expels air through said input and output passages respectively of each blade while that blade is substantially in forward rotational movement relative to the direction of flight of the aircraft.

3. The system of claim 1 wherein said control means includes sensors mounted on the blade surfaces proximate the tip edge for detecting shocks that indicate the onset of HSI noise.

4. The system of claim 1 wherein said control means includes means for determining the rotational speed of each rotor blade, the rotational position of each rotor blade and the aircraft's forward speed.

5. The system of claim 1 wherein each of said rotor blade further includes means for alleviating noise caused by rotor blade vortex interaction.

6. The system of claim 5 wherein said means for alleviating rotor blade vortex interaction noise comprises output passages disposed proximate to or on an outboard tip edge of each blade for controllably expelling pressurized air from said interior volume.

7. The system of claim 6 which includes a fluid source for providing said pressurized air.

8. The system of claim 7 wherein each blade structure includes sensors for determining pressure fluctuation on both or either of the blade surfaces and control means for controlling said expulsion of pressurized air from said output passages in response to pressure determinations by said sensors.

9. A method for lessening high speed impulsive blade noise in rotors of aircraft having a plurality of rotor blades extending radially in spaced relationship from a central hub, each blade having spaced apart upper and lower surfaces, an interior volume between the surfaces and leading and trailing edge portions at the respective joined edges of the upper and lower surfaces of each blade; the surfaces of each blade having air intake passages proximate the leading edge and tip edge and air output passages proximate the trailing edge and tip edge, the method comprising:

during rotation of said aircraft rotors, controllably admitting air into the interior volume of each rotor blade through said air intake passages and controllably expelling air from the interior volume through said output passages, said admitting and expelling of air into and out of each blade being controlled in accordance with one or more sensed conditions of that blade, wherein a sensed condition of each blade is its position during a cycle of rotation.

10. The method of claim 9 wherein air is admitted and expelled to and from the interior volume of each blade when the blade is in a generally forward portion of its rotational movement relative to the direction of movement of the aircraft.

11. The method of claim 9 wherein a further sensed condition is the presence of a shock wave based on the measurement of a pressure discontinuity between sensors arranged linearly from the leading edge to the trailing edge of a rotor blade.

12. The method of claim 11 wherein a further sensed condition is the rotational speed of each rotor blade.

13. The method of claim 12 wherein a further sensed condition is aircraft's forward air speed.

14. The method of claim 13 wherein a further sensed condition is the occurrence of high speed impulse noise produced by said rotating blades.

15. A method for reducing rotor blade noise in an aircraft which comprises controllably expelling pressurized air from the interior of each of a plurality of rotor blades of said aircraft, said controllable expulsion of air being through passages in the outboard tip of each rotor blade in response to determined flight conditions of the aircraft, wherein said condition is determined by sensors mounted on said aircraft, and wherein said sensors are mounted on the aircraft's fuselage.

16. The method of claim 15 wherein said determined flight condition is the level of blade vortex interaction noise and high speed interactive noise.

17. The method of claim 15 wherein said determined flight condition is the pressure fluctuation on each rotor blade as it rotates.

18. The method of claim 15 wherein a plurality of said conditions are determined and control said expulsion of air.

19. The method of claim 18 wherein said air expelled from the interior of each blade through the outboard tip of the blade is controllably introduced into said blade interior from a pressurized air source.

20. The method of claim 19 wherein the pressurized air source is located in the aircraft's fuselage.

21. A system for reducing blade noise in aircraft rotors comprising:

a plurality of rotor blades extending radially from a central hub, each of said blades having spaced apart upper and lower surfaces, an interior volume between said surfaces, leading and trailing edge portions at respective opposing joined edges of said upper and lower surfaces of each blade and an outboard tip portion remote from the central hub;

means for controllably expelling air from the interior volume of each blade selectively through passages in the outboard tip portion of each rotor blade in response to determined flight conditions of the aircraft; and passages on the top and bottom surfaces proximate the leading edge of each blade for controllably admitting at least a portion of said air expelled from the interior volume of each blade, in which air is admitted and expelled in accordance with the position of each blade during an incident of rotation, wherein the blade noise that is reduced comprises high speed impulsive blade noise and blade vortex interaction noise.

22. The system of claim 21 which includes an exterior high pressure air source for controllably supplying at least a portion of said air expelled from the interior volume of each blade.

23. The system of claim 21 which includes sensors for determining said flight conditions.

24. The system of claim 21 which includes sensors for determining the level of said high speed impulsive blade noise and blade vortex interaction noise and controlling said expulsion of air in accordance therewith.

25. The system of claim 21 wherein said controlling means controls admitting and expelling air through said passages of each blade while that blade is substantially in forward rotational movement relative to the direction of flight of the aircraft.

26. The system of claim 24 wherein said controlling means includes pressure sensors for determining pressure fluctuations on the rotor blades and controlling admitting or expelling of air through said passages in accordance therewith.

27. The system of claim 23 wherein said means for controllably expelling air includes servo valves located in the interior of the rotor blade and connected to a conduit supplying high-pressure air from a source; said servo valves controlling the flow of expelled air.

28. The system of claim 23 wherein said control means includes means for determining the air speed of each rotor blade.

29. A system for reducing high speed impulsive blade noise (HSI) in aircraft rotors, the system comprising:
 a plurality of rotor blades extending radially in spaced relationship from a central hub, each of said blades having spaced apart upper and lower surfaces, an interior volume between said surfaces, and leading and trailing edge portions at respective opposing joined edges of said upper and lower surfaces of each blade;
 air intake passages disposed on the upper and lower surfaces of each blade proximate the leading edge and tip edge to controllably admit air into said interior volume;
 air output passages disposed on the upper and lower surfaces of each blade proximate the trailing edge and tip edge to controllably expel air from said interior volume; and
 valves configured to open and close at least one of the air intake passages and air output passages to selectively admit and expel air into and out of the interior volume of each blade in accordance with a determined condition of each blade during its rotation.

30. A method for lessening high speed impulsive blade noise in rotors of aircraft having a plurality of rotor blades extending radially in spaced relationship from a central hub, each blade having spaced apart upper and lower surfaces, an interior volume between the surfaces and leading and trailing edge portions at the respective joined edges of the upper and lower surfaces of each blade; the surfaces of each blade having air intake passages proximate the leading edge and tip edge and air output passages proximate the trailing edge and tip edge, the method comprising:
 during rotation of the aircraft rotors, controllably opening and closing at least one of the air intake passages and air output passages to admit air into the interior volume of each rotor blade through the air intake passages and to expel air from the interior volume through the output passages, the admitting and expelling of air into and out of each blade being controlled in accordance with one or more sensed conditions of that blade.

31. A method for reducing rotor blade noise in an aircraft, comprising:
 controllably introducing air, from a pressurized air source, into an interior of each of a plurality of rotor blades of the aircraft; and
 controllably expelling pressurized air from the interior of each of the plurality of rotor blades of the aircraft through passages in an outboard tip of each rotor blade responsive to noise, produced by the aircraft, measured by sensors mounted on the aircraft.

32. A system for reducing blade noise in aircraft rotors, comprising:
 a plurality of rotor blades extending radially from a central hub, each of said blades comprising spaced apart upper and lower surfaces, an interior volume between said surfaces, and an outboard tip portion remote from the central hub;
 a pressurized air source configured to controllably introduce air into the interior of each of the plurality of rotor blades; and
 valves configured to controllably expel pressurized air from the interior volume of each blade selectively through passages in the outboard tip portion of each rotor blade responsive to noise, produced by the aircraft, measured by sensors mounted on the aircraft.

* * * * *